US011875098B2

(12) United States Patent
Cho

(10) Patent No.: US 11,875,098 B2
(45) Date of Patent: Jan. 16, 2024

(54) APPARATUS AND METHOD FOR DETERMINING FRICTION COEFFICIENT OF BRAKE FRICTION MATERIAL

(71) Applicants: Hyundai Motor Company, Seoul (KR); Kia Motors Corporation, Seoul (KR)

(72) Inventor: Sung Hyun Cho, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 629 days.

(21) Appl. No.: 17/093,769

(22) Filed: Nov. 10, 2020

(65) Prior Publication Data
US 2021/0383040 A1 Dec. 9, 2021

(30) Foreign Application Priority Data
Jun. 4, 2020 (KR) .................. 10-2020-0067680

(51) Int. Cl.
*G06F 30/27* (2020.01)
*B60T 17/22* (2006.01)
*G06N 20/00* (2019.01)
*G06F 111/10* (2020.01)
*B60T 8/171* (2006.01)

(52) U.S. Cl.
CPC .............. *G06F 30/27* (2020.01); *B60T 17/22* (2013.01); *G06N 20/00* (2019.01); *B60T 8/171* (2013.01); *B60T 2250/00* (2013.01); *G06F 2111/10* (2020.01)

(58) Field of Classification Search
CPC ...... G06F 30/27; G06F 2111/10; G06F 30/15; B60T 17/22; B60T 8/171; B60T 2250/00; B60T 2270/406; B60T 8/885; B60T 8/56; B60T 8/17; G06N 20/00; F16D 66/00; F16D 65/092; F16D 65/12; F16D 2066/001; F16D 2121/04
See application file for complete search history.

(56) References Cited

U.S. PATENT DOCUMENTS

| | | | |
|---|---|---|---|
| 5,689,058 A * | 11/1997 | Yuan | G01N 3/56 73/9 |
| 10,919,513 B2 * | 2/2021 | Prehofer | F16D 66/02 |
| 2009/0187320 A1 * | 7/2009 | Antanaitis | B60L 3/0076 701/70 |

(Continued)

OTHER PUBLICATIONS

"Dynamometer Global Brake Effectiveness J2522_200306". Retrieved on Jul. 19, 2023 from https://www.sae.org/standards/content/j2522_200306/ (Year: 2023).*

(Continued)

*Primary Examiner* — Calvin Cheung
(74) *Attorney, Agent, or Firm* — Fox Rothschild LLP

(57) ABSTRACT

An apparatus and a method can accurately estimate and determine a friction coefficient of a brake friction material in real time taking into consideration current driving conditions of a vehicle. The apparatus includes a model generation device configured to generate a friction coefficient meta model to determine the friction coefficient based on information of an operation state of a brake using raw data acquired through a preceding test evaluation process.

18 Claims, 11 Drawing Sheets

(56) References Cited

U.S. PATENT DOCUMENTS

| | | | | |
|---|---|---|---|---|
| 2013/0220746 | A1* | 8/2013 | Unno | F16D 69/028 |
| | | | | 523/156 |
| 2013/0220747 | A1* | 8/2013 | Kikudome | F16D 65/092 |
| | | | | 106/36 |
| 2017/0254378 | A1* | 9/2017 | Takada | C08K 7/02 |
| 2017/0276200 | A1* | 9/2017 | Yagihashi | F16D 69/026 |
| 2018/0106321 | A1* | 4/2018 | Matsuba | C09K 3/14 |
| 2019/0005747 | A1* | 1/2019 | Serra | G01M 17/04 |
| 2020/0249136 | A1* | 8/2020 | Roszman | G01N 3/08 |

OTHER PUBLICATIONS

"What is AK Master Test (SAE J2522)?" Retrieved on Jul. 19, 2023 from https://www.tecsa-rd.it/en/ak-master-test-sae-j2522/#:~:text=AK%20Master%20%28SAE%20J2522%29%20is%20a%20performance%20test,the%20stresses%20of%20the%20brakes%20during%20the%20stops. (Year: 2023).*

"Brake Materials Screening", Retrieved on Jul. 19, 2023 from https://www.bruker.com/en/products-and-solutions/test-and-measurement/tribometers-and-mechanical-testers/brake-materials-screening.html (Year: 2023).*

KR 0174836 B1 with English translation. Date filed Oct. 6, 1993. Date published May 15, 1999. (Year: 1999).*

JP 2003237553 A with English translation. Date filed Feb. 20, 2002. Date published Aug. 27, 2003. (Year: 2003).*

Eltayb et. al., "Least Squares Support Vector Machine Approach for Predicting Frictional Performance of Industrial Brake Pad Materials", International Journal of Mechanical Engineering and Robotics Research vol. 7, No. 2, Mar. 2018, http://www.ijmerr.com/uploadfile/2018/0628/20180628041312573.pdf (Year: 2018).*

Szczypinski-Sala et. al., "The estimation of friction coefficient of brake pad- disc during braking process in different operating conditions", published 2018, retrieved from https://iopscience.iop.org/article/10.1088/1757-899X/421/2/022032/pdf (Year: 2018).*

* cited by examiner

FIG. 4
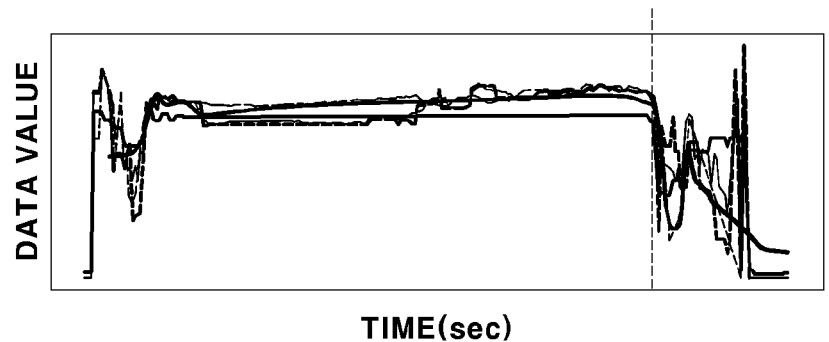
TIME(sec)
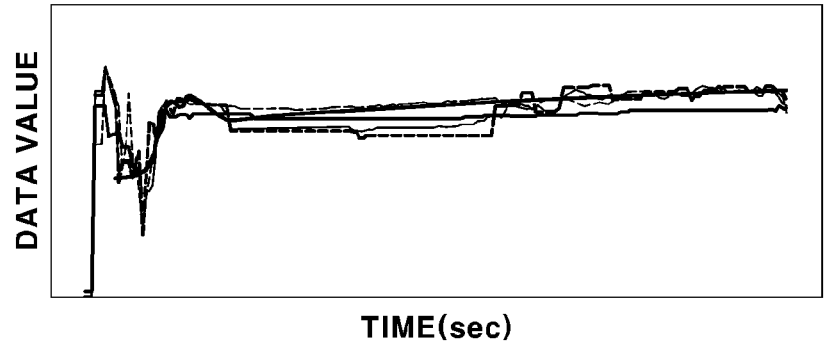
TIME(sec)

APPARATUS AND METHOD FOR DETERMINING FRICTION COEFFICIENT OF BRAKE FRICTION MATERIAL

CROSS-REFERENCE TO RELATED APPLICATION

This application claims under 35 U.S.C. § 119(a) the benefit of Korean Patent Application No. 10-2020-0067680 filed on Jun. 4, 2020, the entire contents of which are incorporated herein by reference.

BACKGROUND

(a) Technical Field

The present disclosure relates to an apparatus and a method for determining a friction coefficient of a brake friction material, more particularly, to the apparatus and method for accurately estimating and determining the friction coefficient of the brake friction material in real time taking into consideration current driving conditions of a vehicle.

(b) Description of the Related Art

As is well known, a vehicle is equipped with a brake device for decelerating or stopping the vehicle while traveling and for maintaining a stopped state of the vehicle. A brake device of a vehicle generates braking force for decelerating or stopping the vehicle using friction. The brake device generates braking force by converting kinetic energy of the vehicle into thermal energy through friction and dissipating the thermal energy to the atmosphere.

The brake device includes a wheel brake mounted to each wheel. The most widely used wheel brake is a disc brake. The disc brake stops the vehicle in a manner such that a brake pad, which is a friction material, is forcibly brought into close contact with opposite surfaces of a disc to stop rotation of the disc.

That is, the disc brake generates braking force using friction between a disc and a brake pad. The disc brake includes the disc configured to rotate integrally with a wheel and a caliper unit configured to press the brake pad (i.e., a friction material) to the disc in order to decelerate or stop the disc using frictional force.

The caliper unit includes a carrier fixed to a vehicle body, a brake pad mounted to the carrier and configured to be pressed to opposite surfaces of the disc in order to generate braking force, and a caliper housing provided with a piston configured to be operated by hydraulic pressure to press the brake pad to the disc.

In addition, the brake device includes a hydraulic pressure supply device that generates and controls a brake hydraulic pressure and supplies the controlled brake hydraulic pressure to the wheel brake. The hydraulic pressure supply device includes a motor pump, a hydraulic line, and a plurality of valves.

In the hydraulic pressure supply device, hydraulic pressure is generated by driving a motor pump, and is transmitted to a caliper unit of each wheel through the hydraulic line and the valves, thereby generating braking force.

Since the hydraulic pressure supply device generates, controls, and supplies a required amount of hydraulic pressure according to a driver's intention to brake the vehicle, the braking force generated by the caliper unit of each wheel may be independently controlled, and the function of an electronic stability control (ESC) system may be easily implemented through the hydraulic pressure supply device.

Among vehicle performance prediction simulations, in order to perform a brake performance prediction simulation, it is necessary to calculate brake torque. Further, it is necessary to input a friction coefficient when the brake torque is calculated in order to predict the brake performance.

Here, the brake torque may be defined using Equation 1 below.

$$Tq = 2 \times \mu \times p \times A_{piston} \times R_{effective} \quad \text{[Equation 1]}$$

Here, Tq represents brake torque, $\mu$ represents the friction coefficient of a brake pad (i.e., a friction material), p represents a brake hydraulic pressure, $A_{piston}$ represents the area of a piston of a caliper housing (i.e., a wheel cylinder), and $R_{effective}$ represents the effective radius of a disc.

As described above, the friction coefficient required to calculate brake torque changes continuously and nonlinearly depending on the brake disc rotation speed $\theta$, the disc temperature T, and the brake hydraulic pressure p.

FIG. 1 (RELATED ART) is a view showing that the friction coefficient of a brake pad, i.e., a friction material of a disc brake, continuously changes over time.

The driving conditions of a vehicle change over time. With the change in the driving conditions of the vehicle, the disc rotation speed $\theta$, the disc temperature T, and the brake hydraulic pressure p also change.

As a result, the friction coefficient, which is determined as a function (i.e., $\mu = f(p, \theta, T)$) of the disc rotation speed, the disc temperature, and the brake hydraulic pressure, changes over time, as shown in FIG. 1.

However, in the conventional art, although the friction coefficient of the brake pad changes depending on the driving conditions of the vehicle, the brake torque is predicted by applying a fixed mean value (i.e., a constant value) to the friction coefficient $\mu$ when predicting the performance of the vehicle.

When the friction coefficient having a fixed mean value (e.g., $\mu = 0.34$, 0.38, or 0.42) is used without considering the real-time change in the friction coefficient depending on the driving conditions of the vehicle, the brake torque is not accurately predicted.

The above information disclosed in this Background section is only for enhancement of understanding of the background of the disclosure, and therefore it may contain information that does not form the related art that is already known in this country to a person of ordinary skill in the art.

SUMMARY

The present disclosure has been made in an effort to solve the above-described problems associated with the related art, and it is an object of the present disclosure to provide an apparatus and a method for accurately estimating and determining the friction coefficient of a brake friction material in real time taking into consideration the current driving conditions of a vehicle.

In one aspect, the present disclosure provides an apparatus for determining a friction coefficient of a brake friction material, the apparatus including a model generation device configured to generate a friction coefficient meta model to determine the friction coefficient based on information of the operation state of a brake using raw data acquired through a preceding test evaluation process. The model generation device includes a preprocessor configured to process the raw data to acquire data required for machine learning, a machine learning unit configured to train a model through machine learning using data acquired by the preprocessor as training data, and a postprocessor configured to further process the model completely trained by the machine learning unit to extract a final friction coefficient meta model to determine the friction coefficient corresponding to the operation state of the brake from an input parameter indicating the operation state of the brake.

In another aspect, the present disclosure provides a method of determining a friction coefficient of a brake friction material, the method including acquiring raw data required to generate a friction coefficient meta model to determine the friction coefficient based on information of the operation state of a brake through a preceding test evaluation process, preprocessing, by a preprocessor, the acquired raw data according to a predetermined algorithm to acquire data required for machine learning, training, by a machine learning unit, a model through machine learning using data acquired by the preprocessor as training data, and further processing, by a postprocessor, the model completely trained by the machine learning unit to extract a final friction coefficient meta model to determine the friction coefficient corresponding to the operation state of the brake from an input parameter indicating the operation state of the brake.

Other aspects and preferred embodiments of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein:

FIG. 4 is a view showing a processing result of an invalid data processor of the preprocessor according to the present disclosure;

Figure 1:
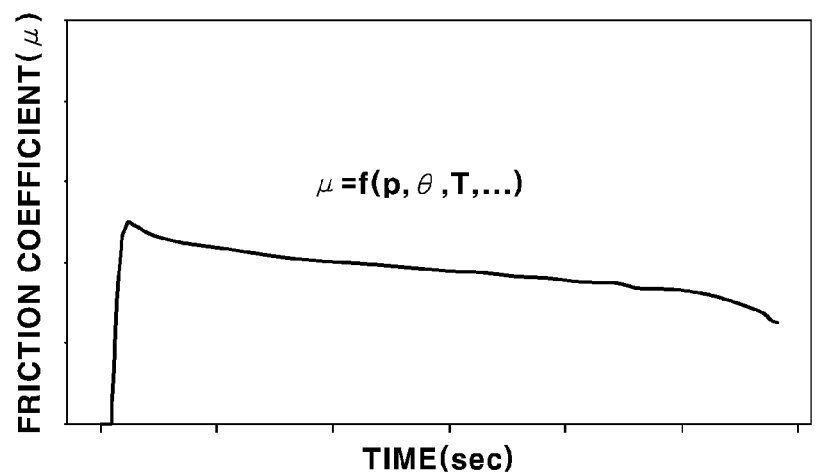
FIG. 1 (RELATED ART) is a view showing that a friction coefficient of a brake pad of a disc brake continuously changes over time.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, embodiments of the present disclosure will be described in detail with reference to the accompanying drawings so that those skilled in the art may easily carry out the embodiments. The present disclosure may, however, be embodied in many different forms, and should not be construed as being limited to the embodiments set forth herein.

Throughout the specification, when an element is referred to as "including" another element, the element should not be understood as excluding other elements so long as there is no special conflicting description, and the element may include at least one other element.

The present disclosure relates to an apparatus and a method for accurately estimating and determining a friction coefficient of a brake friction material in real time taking into consideration current driving conditions of a vehicle by generating a model for determining the friction coefficient of the brake friction material and applying the generated model to an actual vehicle.

As described above, when brake torque Tq is calculated for a brake performance prediction simulation among vehicle performance prediction simulations, if the friction coefficient having a fixed mean value is used without considering the real-time change in the friction coefficient $\mu$ depending on the driving conditions of the vehicle, such as the driving mode, the brake torque is not accurately predicted.

In order to predict the performance of a vehicle, the brake torque may be predicted by creating a friction coefficient map depending on a driving mode using friction coefficient data determined based on the evaluation results of a test performed with respect to respective driving modes and determining a friction coefficient corresponding to the current driving mode based on the friction coefficient map.

In this case, however, only the friction coefficient measured during a test, specifically a dyno test, performed with respect to respective driving modes is capable of being predicted.

In addition, in order to predict the performance of a vehicle, the brake torque may be predicted by measuring a change in friction coefficient depending on the temperature of a brake disc, creating a friction coefficient map depending on the temperature of the disc, and determining a friction coefficient corresponding to the current temperature of the disc based on the friction coefficient map.

In this case, however, it is possible to reflect a change in the friction coefficient depending on the disc temperature T, but it is impossible to reflect the influence of the disc rotation speed $\theta$ and the brake hydraulic pressure p, which change simultaneously with the change in the disc temperature.

Accordingly, the brake torque calculated through the known method is different from the actual brake torque, and thus the simulation result is unreliable. Therefore, there is a need for technology for improving the accuracy of the simulation result.

Further, there has not been developed any method of simultaneously reflecting the disc rotation speed, the disc temperature, and the brake hydraulic pressure, which influence a change in the friction coefficient. Thus, it is impossible to accurately predict the friction coefficient, and it is difficult to accurately calculate the brake torque and to acquire an accurate simulation result.

In order to solve the above problems, disclosed herein is a technology of extracting an evaluation input and a friction coefficient from data on actual brake torque evaluation results, creating a model for predicting a friction coefficient using the disc rotation speed, the disc temperature, and the brake hydraulic pressure, which change depending on the driving conditions of a vehicle, through a machine learning process, and accurately estimating the friction coefficient of a brake pad (i.e., a friction material) using the above model.

Through this method, it is possible to predict an accurate friction coefficient depending on current driving conditions of a vehicle, to improve the accuracy of calculation of brake torque using the accurately predicted friction coefficient value, and ultimately to improve the accuracy of prediction of driving performance of the vehicle.

Hereinafter, an apparatus and a method for determining a friction coefficient according to the present disclosure will be described in more detail with reference to the drawings.

The method of determining a friction coefficient according to the present disclosure includes a process of generating and constructing a friction coefficient meta model for determining a friction coefficient $\mu$ of a friction material used in a disc brake of a vehicle, i.e., a brake pad. Accordingly, the apparatus for determining the friction coefficient according to the present disclosure includes a model generation device for generating and constructing the friction coefficient meta model.

Figure 2:
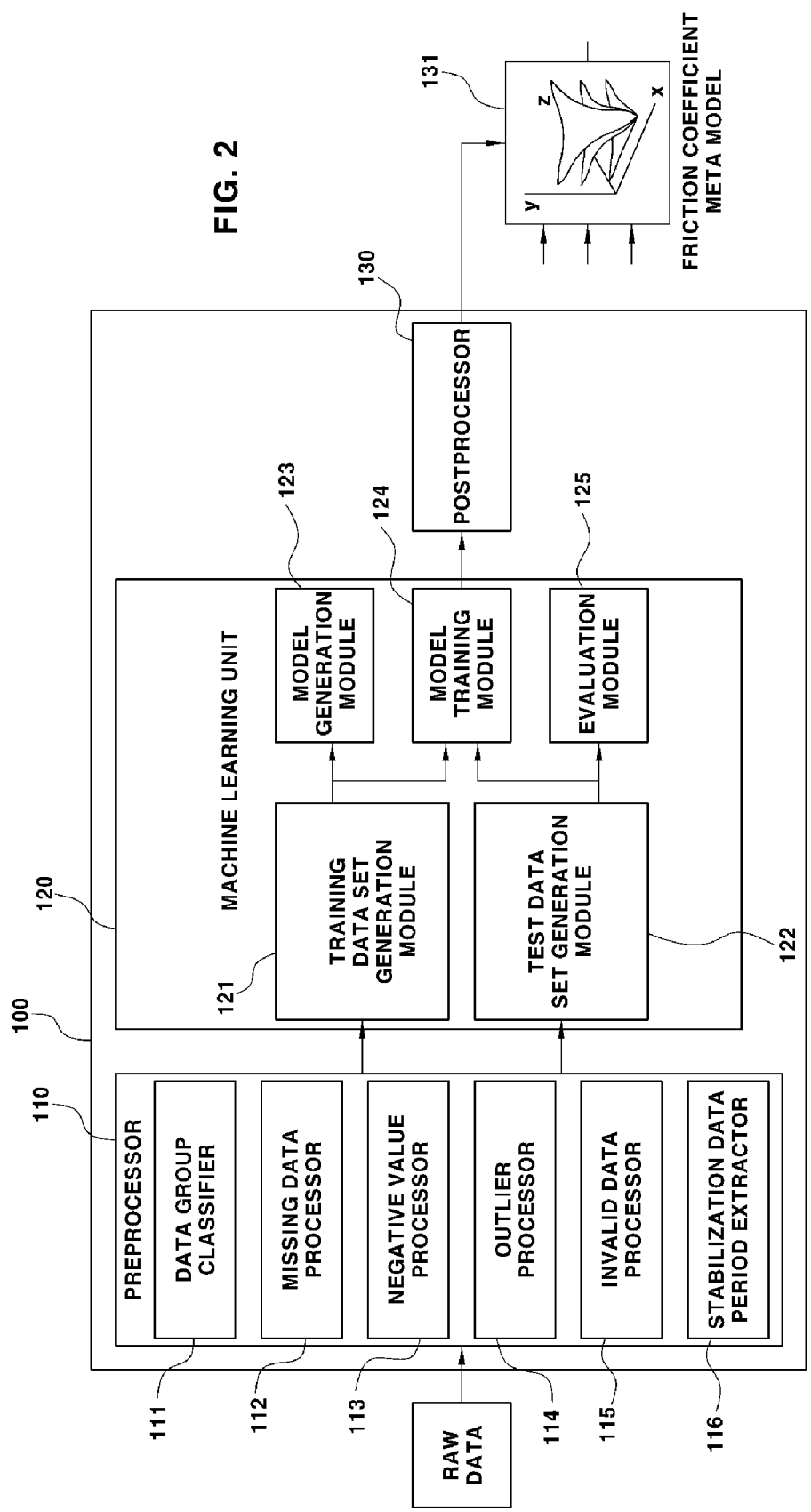
FIG. 2 is a block diagram showing a configuration of a model generation device for generating a friction coefficient meta model according to the present disclosure.

FIG. 2 is a block diagram showing a configuration of a model generation device for generating a friction coefficient meta model according to the present disclosure. According to the present disclosure, the finally generated friction coefficient meta model may be input and stored in advance in a controller of a vehicle, and may be used to estimate a friction coefficient using received real-time information of a brake disc rotation speed, a disc temperature, and a brake hydraulic pressure, which change depending on driving conditions of a vehicle.

According to the present disclosure, the friction coefficient of a brake pad (i.e., a friction material), which is determined taking into consideration the current driving conditions of the vehicle, may be used in various control logics in the vehicle, may be used to calculate real-time brake torque information, and may be further used to predict and evaluate brake performance and vehicle performance.

According to the present disclosure, the finally generated friction coefficient meta model may estimate the friction coefficient based on the disc rotation speed, the disc temperature, and the brake hydraulic pressure, and may output the estimated friction coefficient. Thus, when the output from the meta model is input to a torque calculator within the controller, the torque calculator may calculate brake torque using the received friction coefficient, thereby eventually enabling evaluation of brake performance and vehicle performance.

The configuration for generating the friction coefficient meta model will now be described. As shown in FIG. 2, a model generation device 100 includes a preprocessor 110, which receives, as input, raw data acquired through preceding test evaluation and preprocesses the received raw data according to a predetermined algorithm to acquire data required for machine learning, and a machine learning unit 120, which trains the model for determining a friction coefficient through machine learning using the data acquired by the preprocessor 110 as training data.

Preferably, the model generation device 100 may further include a postprocessor 130, which further processes the model completely trained by the machine learning unit 120 to extract a final friction coefficient meta model for determining a friction coefficient corresponding to the operation state of the brake from an input parameter indicating the operation state of the brake.

In the model generation device 100, the raw data that is input to the preprocessor 110 includes data on input/output parameters in a model necessary to perform machine learning.

Here, the input parameter may include a brake disc rotation speed θ, a disc temperature T, and a brake hydraulic pressure p, and the output parameter may be a friction coefficient μ.

The preceding test evaluation for generating the raw data may be the known dyno evaluation. In the dyno evaluation process, the friction coefficient behavior varies depending on the use history of a friction material (i.e., a brake pad), and thus evaluation and data acquisition corresponding to the state of the friction material need to be implemented.

To this end, the state of a new friction material and the friction coefficient behavior thereof are primarily evaluated prior to burnishing. In order to evaluate the friction coefficient behavior, during the dyno evaluation, the disc rotation speed and the brake hydraulic pressure are measured through sensors mounted in the vehicle. At the same time, the disc temperature is estimated through a known method or is measured through a sensor, and the brake torque applied to the wheel and to the disc is measured through a separate torque sensor.

Here, because the disc rotation speed θ is the same as the rotation speed of a corresponding wheel, i.e., the wheel speed, it is capable of being measured through a wheel speed sensor in real time. The brake hydraulic pressure is capable of being measured through a pressure sensor provided in a hydraulic pressure supply device that generates a brake hydraulic pressure, e.g., a pressure sensor provided in a known electronic stability control (ESC) unit.

The disc rotation speed θ may be obtained using information such as a vehicle speed or a tire dynamic radius.

In a vehicle, the brake disc temperature may be estimated in real time, or may be measured using a sensor. There is a known method in which an estimated disc temperature is used as an input parameter for brake control, e.g., hydraulic brake fading compensation (HFC) control. In the specification, since a method of estimating the disc temperature is well known to those skilled in the art, a detailed description thereof will be omitted.

Alternatively, it is possible to acquire raw data indicating the disc temperature by measuring the disc temperature through a sensor, i.e., a temperature sensor, in real time.

In addition, after the brake torque is measured through a dyno evaluation, it is possible to determine the real-time friction coefficient information using Equation 1 above based on the measured brake torque, the disc rotation speed, and the disc temperature.

As described above, the first raw data is acquired through primary evaluation of the new product.

In addition, after evaluation of the new product, the state of a burnished friction material and the friction coefficient behavior thereof are secondarily evaluated through the same method, assuming actual field use conditions after release of a vehicle, and the state of a friction material that is fading and the friction coefficient behavior thereof are thirdly evaluated through the same method.

Subsequently, the state of a friction material that has faded and the friction coefficient behavior thereof are fourthly evaluated through the same method. This serves to confirm the change in the performance of the friction material caused by the thermochemical change attributable to fading. The evaluation and measurement results obtained from the respective steps described above are secured as raw data.

The raw data obtained through the secondary evaluation of the burnished friction material will be referred to as "second raw data", the raw data obtained through the third evaluation of the friction material that is fading will be referred to as "third raw data", and the raw data obtained through the fourth evaluation of the friction material that has faded will be referred to as "fourth raw data".

Although the first, second, third and fourth raw data have been described above as being acquired depending on the state of the friction material, it is also possible to acquire raw data depending on the type of the friction material and to generate a model trained depending on the type of the friction material through machine learning using the raw data acquired depending on the type of the friction material.

According to the present disclosure, the model generation device 100 may be a computer device in which software programmed to generate a final meta model using received raw data is installed and executed.

In this case, each of the components of the model generation device 100 shown in FIG. 2 may be a hardware component in which individual programs for implementing a corresponding function are executed, or may be program blocks provided in the individual programs in order to implement a corresponding function.

According to the present disclosure, each of the components of the model generation device 100 may be configured as code in a python programming language or code in any other known programming language.

As described above, the model generation device 100 includes the preprocessor 110, the machine learning unit 120, and the postprocessor 130. The preprocessor 110 may include a data group classifier 111, a missing data processor 112, a negative value processor 113, an outlier processor 114, an invalid data processor 115, and a stabilization data period extractor 116.

The machine learning unit 120 may include a training data set generation module 121, a test data set generation module 122, a model generation module 123, a model training module 124, and an evaluation module 125.

The data group classifier 111 of the preprocessor 110 distinguishes between data based on a data path in which raw data corresponding to each test model is stored and a standardized file name, gives group names to the data, and classifies data groups so that the groups of the first to fourth raw data are identified using code indicating the state of the friction material defined in the standardized file name.

That is, all of the raw data is classified into the first raw data, the second raw data, the third raw data, and the fourth raw data based on the state of the friction material.

In the data group classifier 111 of the preprocessor 110, all of the raw data is grouped based on the state of the friction material so that the data groups are identified. Later, machine learning may be performed on a data group basis using the data groups identified by the machine learning unit 120.

The missing data processor 112 of the preprocessor 110 is a component that processes missing raw data measured by the sensor during the dyno evaluation. With regard to a meaningful period among the model input and output parameter values of the raw data, the missing data processor 112 acquires missing data through linear interpolation using an intermediate value between the values before and after a corresponding row (i.e., the missing parameter value).

In the raw data, the input parameter may include the disc rotation speed θ, the disc temperature T, and the brake hydraulic pressure p, which serve as model inputs, and the output parameter may be the friction coefficient μ, which serves as a model output.

When missing data occurs in a meaningless period among the input and output parameter values of the raw data, e.g., a period in which the measurement is performed immediately before the evaluation is started and thus no valid value is present and a period in which the measurement is maintained even after the evaluation is completed and thus no valid value is present, a corresponding row and the data thereof are deleted.

The negative value processor 113 of the preprocessor 110 is a component that processes a negative value of the raw data measured by the sensor during the dyno evaluation. When at least one negative value is present in a meaningful period among the model input and output parameter values of the raw data, the negative value processor 113 substitutes the data having a negative value with data having a positive value through linear interpolation using an intermediate value between the values before and after a corresponding value, and secures data having a positive value.

Similarly, when a negative value is present in a meaningless period among the input and output parameter values of the raw data, e.g., a period in which the measurement is performed immediately before the evaluation is started and thus no valid value is present and a period in which the measurement is maintained even after the evaluation is completed and thus no valid value is present, a corresponding row and the data thereof are deleted.

The outlier processor 114 of the preprocessor 110 is a component that removes a friction coefficient having a physically unrealizable magnitude, which is generated due to noise of the dyno evaluation equipment or the sensor, and the data related thereto from the raw data.

Figure 3:
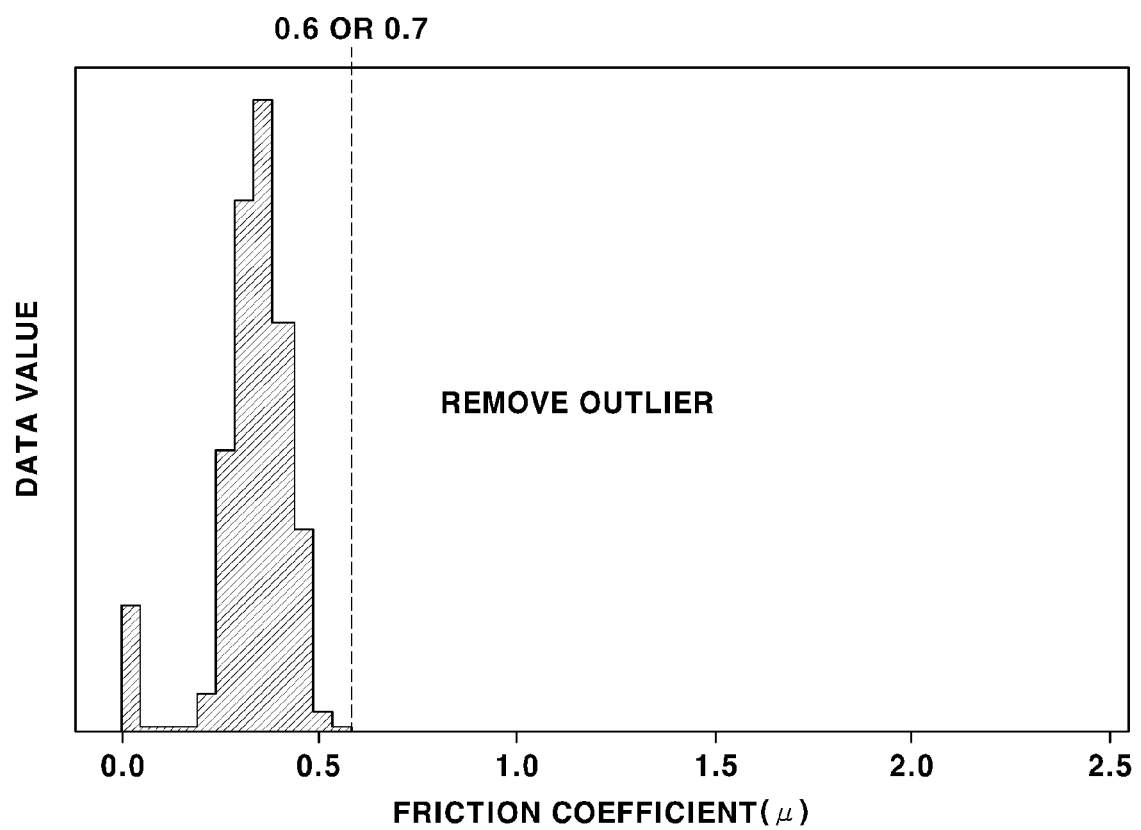
FIG. 3 is a view showing a processing result of an outlier processor of a preprocessor according to the present disclosure.

The outlier processor 114 removes input and output data related to a friction coefficient that exceeds a reference value set based on the existing development history depending on the characteristics of the friction material. For example, as shown in FIG. 3, in the case of a non-steel-based friction material, a row exceeding the friction coefficient of 0.6 and related input and output data are removed from the raw data, and in the case of a low-steel-based friction material, a row exceeding the friction coefficient of 0.7 and related input and output data are removed from the raw data.

In this case, linear interpolation is performed using an intermediate value between the values before and after the removed row (i.e., the removed parameter value), and the linearly interpolated value is taken as the value of the removed row and secured.

The invalid data processor 115 of the preprocessor 110 is a component that processes data, obtained while the equipment is stopped after the dyno evaluation is completed, as invalid data.

That is, because the data obtained after the dyno evaluation is completed is data in an invalid period that is irrelevant to the evaluation, the invalid data processor 115 determines the period in which the equipment is stopped after the dyno evaluation is completed as an invalid period, and removes the data in the invalid period.

For example, as shown in FIG. 4, the invalid data processor 115 may determine data in a period in which the vehicle speed is less than a reference vehicle speed of 1 km/hr after the evaluation is completed as invalid data, and may remove the invalid data from the raw data.

Figure 5:
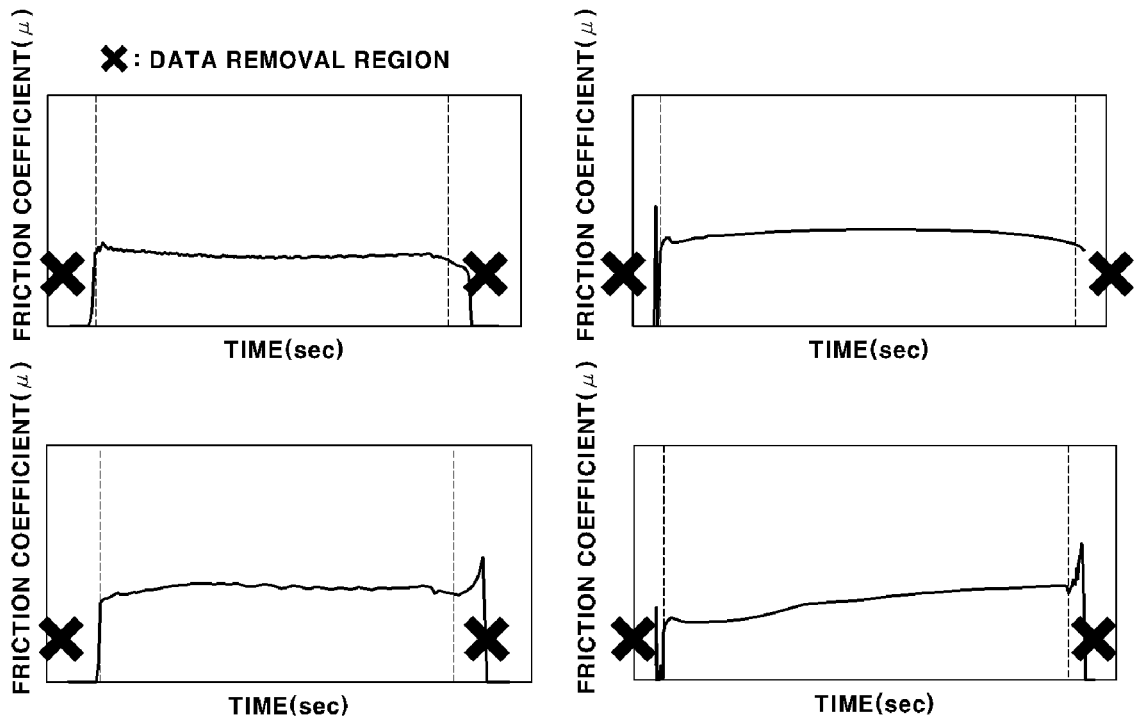
FIG. 5 is a view showing a processing result of a stabilization data period extractor of the preprocessor according to the present disclosure.

The stabilization data period extractor 116 of the preprocessor 110 is a component that removes irregular data and noise, generated during the dyno control process, from the dyno evaluation data. As shown in FIG. 5, the stabilization data period extractor 116 extracts a period that meets the movement standard deviation criterion, determines the data in the extracted period as data for training the model, and removes the remaining periods other than the extracted period.

In particular, only a period in which the standard deviation of the friction coefficient from an arbitrary starting time point to the $n^{th}$ time point set at predetermined regular time intervals is maintained at a predetermined reference value or less from the arbitrary starting time point to the $m^{th}$ time point (where m<n) is accepted as a valid period, and the data in the accepted valid period is determined as data for training the model.

For example, only a period in which the standard deviation of the friction coefficient from the current time point to the tenth time point set at predetermined regular time intervals is maintained at a reference value of 0.03 or less from the current time point to the fifth time point is accepted as a valid period, and the data in the accepted valid period is determined as data for training the model.

Figure 6:
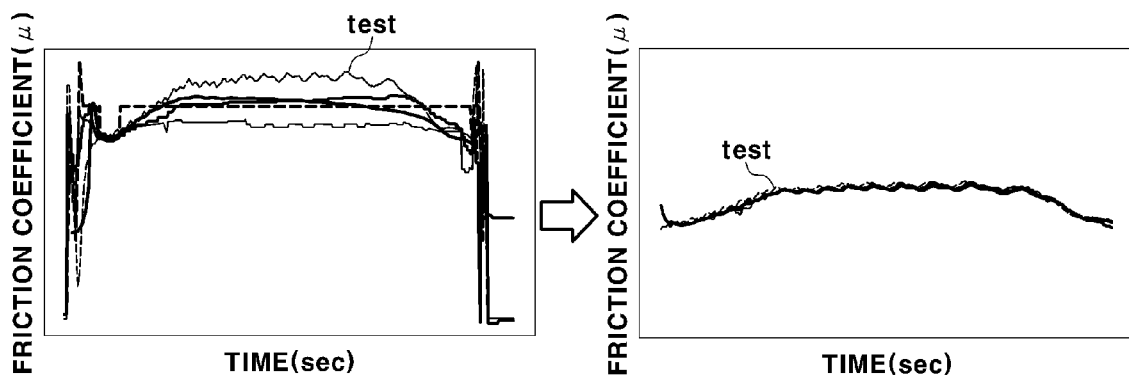
FIGS. 6 and 7 are views showing model training results before and after the preprocessor according to the present disclosure is applied.
Figure 7:
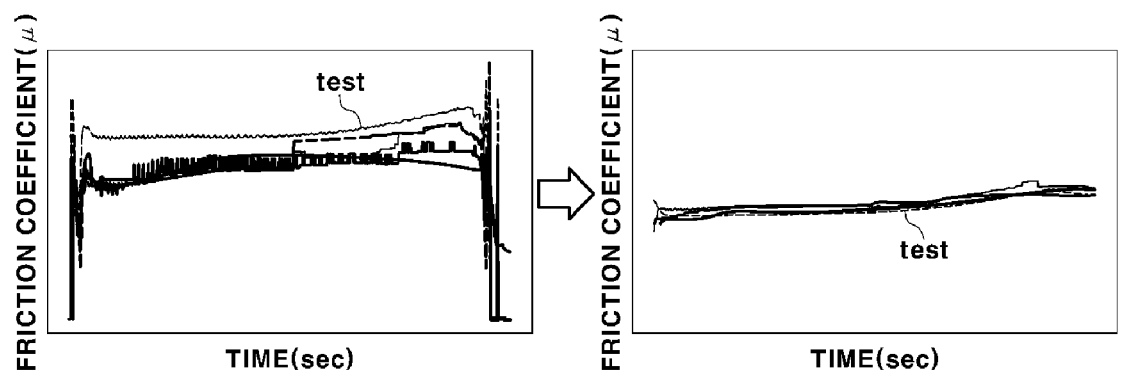

FIGS. 6 and 7 are views showing a difference in effects between a configuration in which the preprocessor 110 is absent and a configuration in which the preprocessor 110 is present. FIG. 6 is a view showing the result of training the model using, as training data for machine learning, raw data that has not been processed by the missing data processor 112, the negative value processor 113, the outlier processor 114, the invalid data processor 115, or the stabilization data period extractor 116 of the preprocessor 110.

FIG. 7 is a view showing the result of training the model using, as training data for machine learning, raw data that has been processed by the missing data processor 112, the negative value processor 113, the outlier processor 114, the invalid data processor 115, and the stabilization data period extractor 116.

Unlike FIG. 6, which shows the result of training the model using a configuration in which the preprocessor 110 is absent, referring to the model training result shown in FIG. 7, it can be seen that, when the missing data processor 112, the negative value processor 113, the outlier processor 114, the invalid data processor 115, and the stabilization data period extractor 116 are used, the difference between the result output from the machine learning model and the actual test data is greatly reduced.

As a result, it is possible to predict the friction coefficient using the machine learning model according to the present disclosure.

The machine learning unit 120 receives the preprocessed data from the preprocessor 110 as input. The training data set generation module 121 and the test data set generation module 122 of the machine learning unit 120 select and determine a training data set for model learning and training and a test data set for testing learning performance from the data sets of the preprocessed data.

In the training data set, the input parameter may include data on the disc rotation speed θ, the disc temperature T, and the brake hydraulic pressure p, and the output parameter may be the friction coefficient μ.

The training data set generation module 121 may select some of all of the data sets, constituted by the data preprocessed by the preprocessor 110, as the training data set.

Similarly, in the test data set, the input parameter may include data on the disc rotation speed θ, the disc temperature T, and the brake hydraulic pressure p, and the output parameter may be the friction coefficient μ.

In this case, the test data set generation module 122 may select the remaining data sets, other than the training data set, among all of the data sets, constituted by the data preprocessed by the preprocessor 110, as the test data set.

The model generation module 123 of the machine learning unit 120 generates a model defining a correlation between the input parameter and the output parameter using the preprocessed data, and the model training module 124 of the machine learning unit 120 trains the model using the training data set.

The evaluation module 125 of the machine learning unit 120 evaluates the reliability of the trained model using the test data set and the model prediction (estimation) value.

In this case, the machine learning unit 120 compares the output parameter value (the friction coefficient μ) of the test data set with the output value (the friction coefficient μ) predicted through the trained model under the condition that the input parameter values are the same, and evaluates the trained model based on the comparison result.

Subsequently, the postprocessor 130 further processes the model that has completely undergone machine learning and training to extract a final friction coefficient meta model 131 in a format that is capable of being connected to the torque calculator of the actual vehicle.

Figure 8:
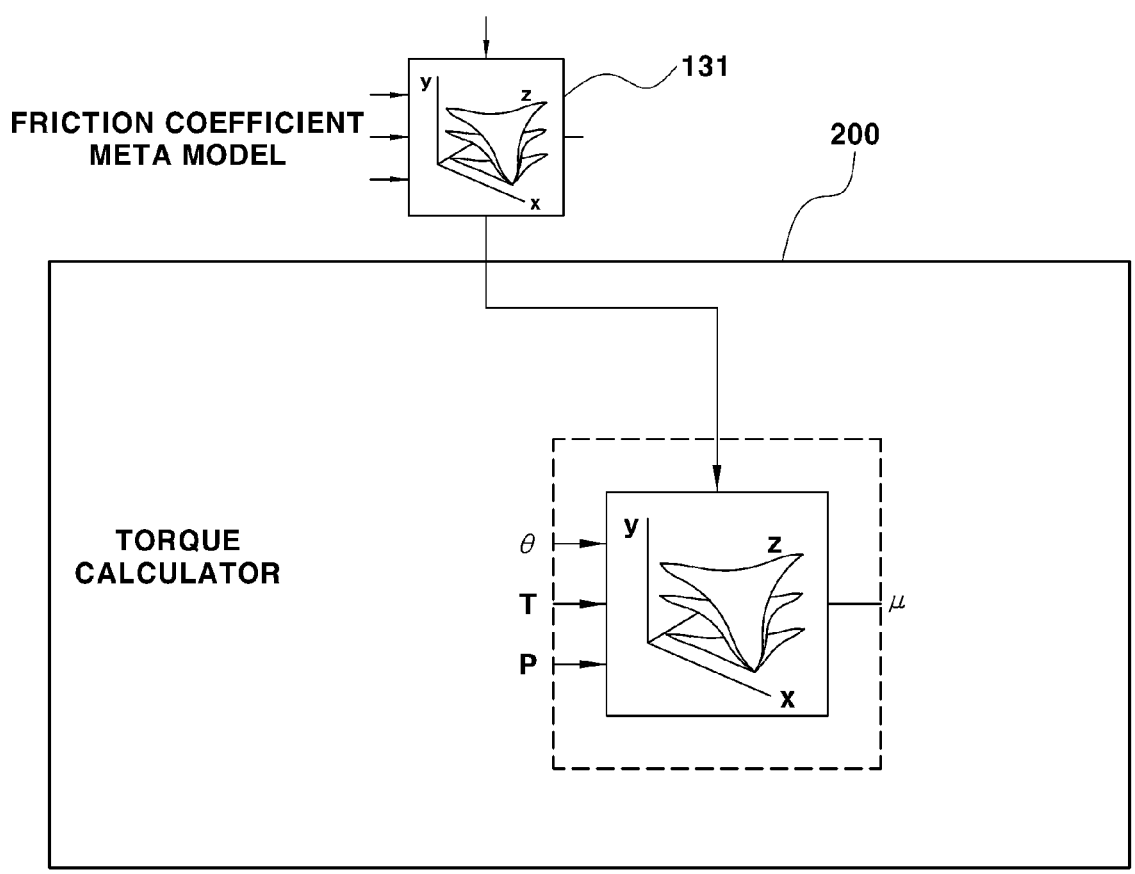
FIG. 8 is a view showing a process of extracting a model so that a finally generated friction coefficient meta model according to the present disclosure is connected to a torque calculator.

FIG. 8 is a view showing the process of extracting a model so that the finally generated friction coefficient meta model is connected to the torque calculator.

As shown in FIG. 8, the postprocessor 130 of the model generation device 100 extracts the final friction coefficient meta model 131 so that the extracted model has the same input port and output port as during machine learning and is connected to the torque calculator 200.

The final friction coefficient meta model 131 generated in the model generation device 100 may be input and stored in advance in the controller of the actual vehicle. In the controller, the final friction coefficient meta model 131 may be connected to the torque calculator 140, and may be used to determine the friction coefficient of the friction material (i.e., the brake pad) depending on the driving conditions of the vehicle based on the real-time information of the operation state of the brake.

In addition, when the friction coefficient of the friction material determined by the friction coefficient meta model 131 is input to the torque calculator 200 while the actual vehicle is traveling, the torque calculator 200 calculates brake torque using the friction coefficient of the friction material determined by the friction coefficient meta model.

Figure 9:
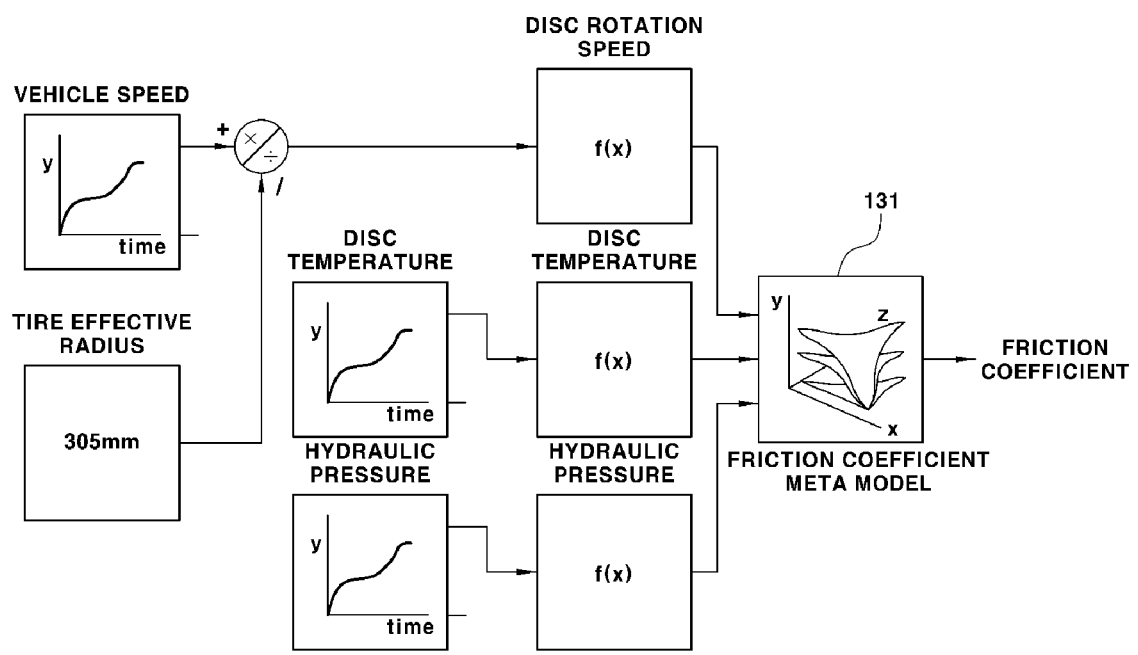
FIG. 9 is a view showing a process in which a friction coefficient is determined by a model based on a disc rotation speed, a disc temperature, and a brake hydraulic pressure according to the present disclosure.
Figure 10:
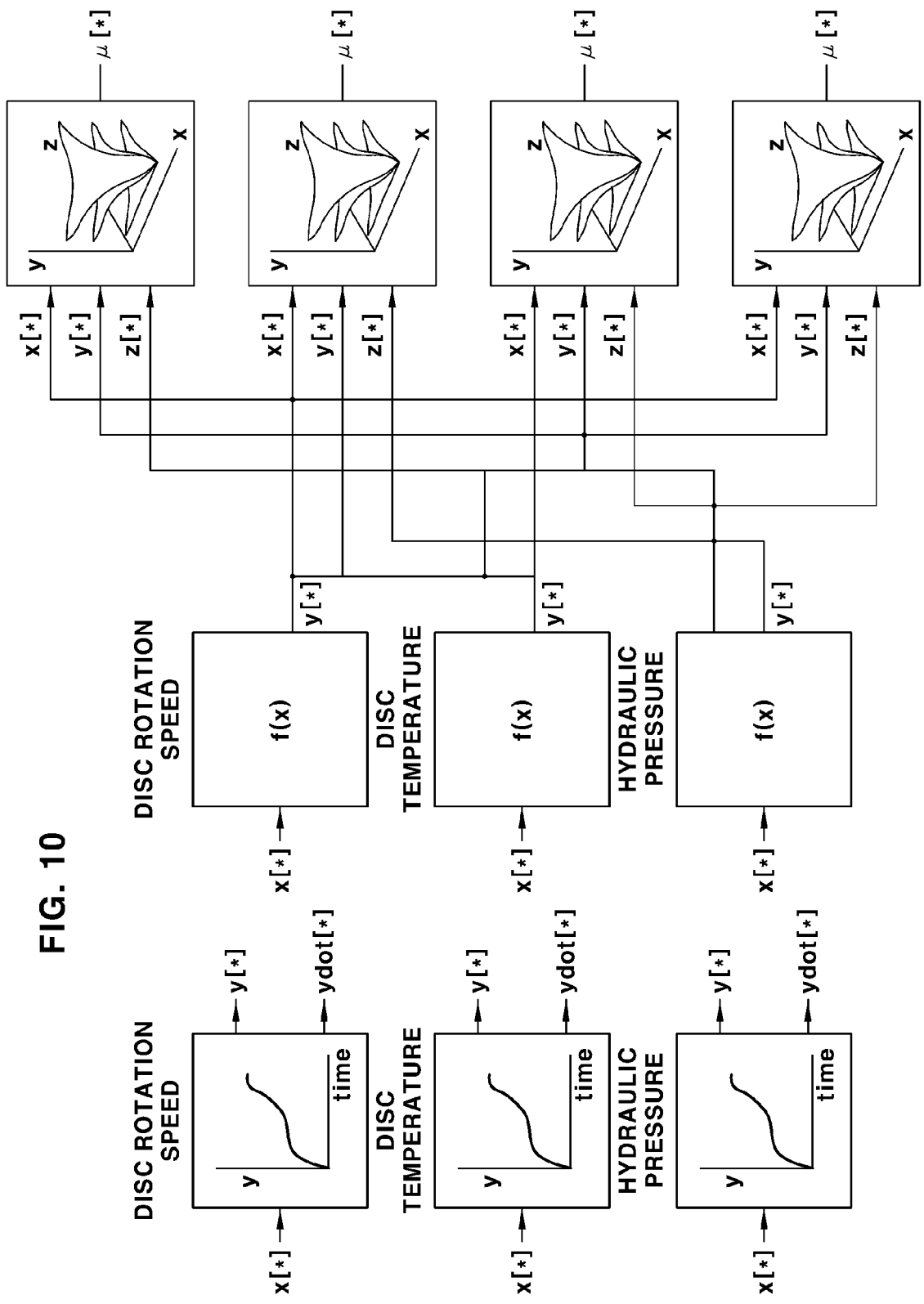
FIG. 10 is a view showing the use of the friction coefficient meta model depending on the type of the friction material according to the present disclosure.

FIG. 9 is a view showing the process in which the friction coefficient is determined by the model based on the disc rotation speed, the disc temperature, and the brake hydraulic pressure according to the present disclosure, and FIG. 10 is a view showing the use of the friction coefficient meta model depending on the type of the friction material according to the present disclosure.

According to the present disclosure, it is also possible to acquire raw data depending on the type of the friction material and to generate a model trained depending on the type of the friction material through machine learning using the raw data acquired depending on the type of the friction material.

Accordingly, as shown in FIG. 10, it is possible to predict and compare the change in the friction coefficients of respective friction materials using the meta model trained depending on the type of the friction material under the condition that the input parameter values are the same.

As described above, the friction coefficient meta model may be used to determine the friction coefficient μ based on real-time information of the operation state of the brake collected while the actual vehicle is traveling, i.e., real-time information of the disc rotation speed θ, the disc temperature T, and the brake hydraulic pressure p, which change depending on the driving conditions of the vehicle.

Figure 11:
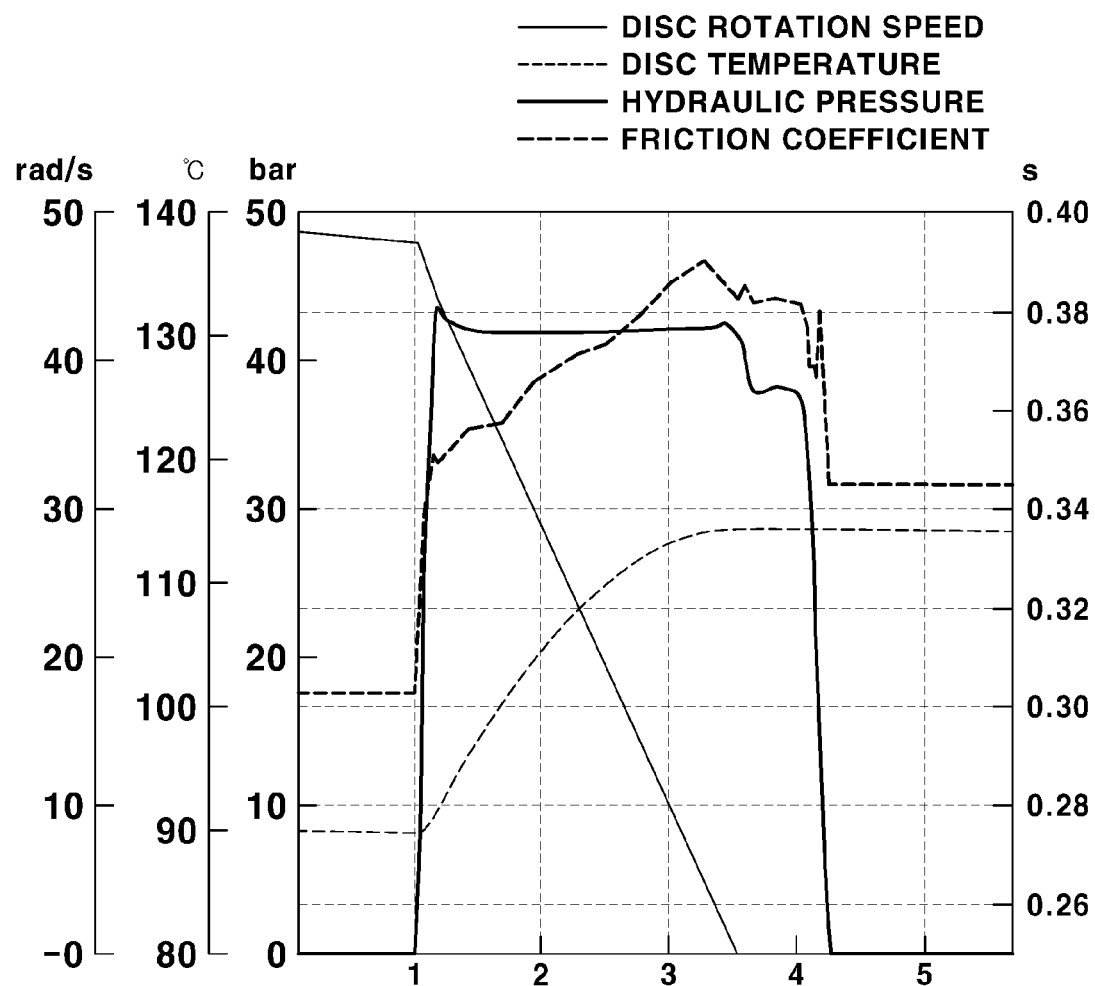
FIG. 11 is a view illustrating a result of predicting a friction coefficient using the friction coefficient meta model according to the present disclosure.

FIG. 11 is a view illustrating a result of predicting a friction coefficient using the friction coefficient meta model according to the present disclosure.

As described above, the friction coefficient meta model determines a friction coefficient depending on the current driving conditions of the vehicle, and the torque calculator calculates brake torque depending on the current driving conditions of the vehicle using the friction coefficient determined by the friction coefficient meta model. Accordingly, it is possible to accurately predict brake performance and vehicle performance.

The friction coefficient meta model is connected to the torque calculator, and the torque calculator is connected to the vehicle model. As a result, it is possible to calculate the brake torque taking into consideration a change in the friction coefficient depending on the driving conditions of the vehicle, and thus to accurately predict brake performance.

Figure 12:
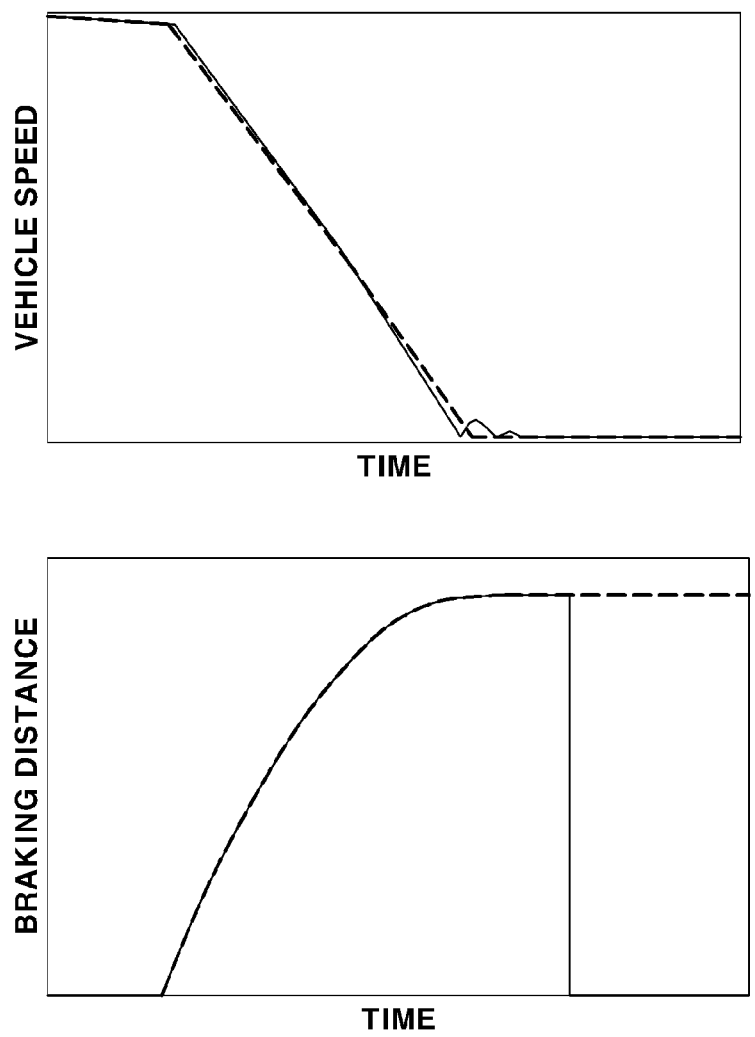
FIG. 12 is a view illustrating a simulation result of a vehicle to which the friction coefficient meta model according to the present disclosure is applied.

FIG. 12 is a view illustrating a simulation result of a vehicle to which the friction coefficient meta model according to the present disclosure is applied. It can be seen that the vehicle speed and the braking distance measured in the actual test are substantially identical to those calculated in simulation using the meta model.

Although the embodiment of the present disclosure has been described by way of example as being applied to a disc brake, it may also be applied to a drum brake, without limitation as to the specific type of a brake.

It will be apparent to those skilled in the art that, when the present disclosure is applied to a drum brake, rather than to a disc brake, the disc described above is replaced by a rotor (also referred to as a drum).

In addition, it will be apparent to those skilled in the art that the friction material described above may be a brake pad of a disc brake or a lining (also referred to as a brake pad) of a drum brake.

As is apparent from the above description, according to an apparatus and a method for determining a friction coefficient of a brake friction material according to the present disclosure, it is possible to accurately estimate and determine the friction coefficient of the brake friction material in real time taking into consideration current driving conditions of a vehicle using a friction coefficient meta model generated by a model generation device.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. An apparatus for determining a friction coefficient of a brake friction material, the apparatus comprising:
a model generation device configured to generate a friction coefficient meta model to determine the friction coefficient based on information of an operation state of a brake using raw data acquired through a preceding test evaluation process,
wherein the model generation device comprises:
a preprocessor configured to process the raw data to acquire data required for machine learning;
a processor configured to train a model through machine learning using data acquired by the preprocessor as training data; and
a postprocessor configured to further process the model completely trained by the machine learning unit to extract a final friction coefficient meta model to determine the friction coefficient corresponding to the operation state of the brake from an input parameter indicating the operation state of the brake; and wherein the raw data comprises data on a rotation speed and a temperature of a brake disc or a rotor and a brake hydraulic pressure, indicating the operation state of the brake, and data on the friction coefficient corresponding to the operation state of the brake.

2. The apparatus of claim 1, wherein the information of the operation state of the brake comprises a rotation speed and a temperature of a brake disc or a rotor and a brake hydraulic pressure.

3. The apparatus of claim 1, wherein the raw data is acquired depending on a state of the brake friction material, wherein the preprocessor comprises a data group classifier configured to group the raw data input thereto based on the state of the brake friction material and to classify data groups so that the data groups are identified, and wherein the machine learning unit trains the model through machine learning using the data groups identified depending on the state of the brake friction material.

4. The apparatus of claim 1, wherein the preprocessor comprises at least one of:

a missing data processor configured to acquire data missing from the raw data input thereto through linear interpolation;

a negative value processor configured to substitute a negative value among the raw data input thereto with a positive value obtained through linear interpolation;

an outlier processor configured to remove data related to the friction coefficient greater than a predetermined reference value from the raw data input thereto;

an invalid data processor configured to remove data in an invalid period from the raw data input thereto; or a stabilization data period extractor configured to extract a period that meets a movement standard deviation criterion of the friction coefficient from the raw data input thereto, to secure data in an extracted valid period as data for model training, and to remove data in remaining periods.

5. The apparatus of claim 4, wherein in the outlier processor, the reference value is a value set depending on characteristics of the brake friction material.

6. The apparatus of claim 5, wherein the reference value is a value set depending on a material of the brake friction material.

7. The apparatus of claim 4, wherein in the invalid data processor, the invalid period is a period in which a vehicle speed is less than a reference vehicle speed set as a vehicle speed at which evaluation in the preceding test evaluation process is completed.

8. The apparatus of claim 4, wherein the stabilization data period extractor accepts a period in which a standard deviation of the friction coefficient from an arbitrary starting time point to an $n^{th}$ time point set at predetermined regular time intervals is maintained at a predetermined reference value or less from the arbitrary starting time point to an $m^{th}$ time point (where m<n) as a valid period, determines data in the accepted valid period as data for model training, and removes data in remaining periods other than the accepted valid period.

9. A method of determining a friction coefficient of a brake friction material, the method comprising:

acquiring raw data required to generate a friction coefficient meta model to determine the friction coefficient based on information of an operation state of a brake through a preceding test evaluation process;

preprocessing, by a preprocessor, the acquired raw data according to a predetermined algorithm to acquire data required for machine learning;

training, by a processor, a model through machine learning using data acquired by the preprocessor as training data; and further processing, by a postprocessor, the model completely trained by the machine learning unit to extract a final friction coefficient meta model to determine the friction coefficient corresponding to an operation state of a brake from an input parameter indicating the operation state of the brake;

wherein the raw data comprises data on a rotation speed and a temperature of a brake disc or a rotor and a brake hydraulic pressure, indicating the operation state of the brake, and data on the friction coefficient corresponding to the operation state of the brake.

10. The method of claim 9, further comprising:

determining, by a controller in which the final friction coefficient meta model is input and stored, the friction coefficient using the stored friction coefficient meta model based on real-time information of the operation state of the brake collected while a vehicle is traveling.

11. The method of claim 9, wherein the information of the operation state of the brake comprises a rotation speed and a temperature of a brake disc or a rotor and a brake hydraulic pressure.

12. The method of claim 9, wherein the raw data is acquired depending on a state of the brake friction material, wherein the preprocessor comprises a data group classifier configured to group the raw data input thereto based on the state of the brake friction material and to classify data groups so that the data groups are identified, and wherein the machine learning unit trains the model through machine learning using the data groups identified depending on the state of the brake friction material.

13. The method of claim 12, wherein the state of the brake friction material comprises a new brake friction material, a brake friction material that has been burnished, a brake friction material that is fading, and a brake friction material that has faded, and wherein the raw data is data acquired depending on the state of the brake friction material through the preceding test evaluation process.

14. The method of claim 9, wherein the preprocessor comprises at least one of:

a missing data processor configured to acquire data missing from the raw data input thereto through linear interpolation;

a negative value processor configured to substitute a negative value among the raw data input thereto with a positive value obtained through linear interpolation;

an outlier processor configured to remove data related to the friction coefficient greater than a predetermined reference value from the raw data input thereto;

an invalid data processor configured to remove data in an invalid period from the raw data input thereto; or a stabilization data period extractor configured to extract a period that meets a movement standard deviation criterion of the friction coefficient from the raw data input thereto, to secure data in an extracted valid period as data for model training, and to remove data in remaining periods.

15. The method of claim 14, wherein in the outlier processor, the reference value is a value set depending on characteristics of the brake friction material.

16. The method of claim 15, wherein the reference value is a value set depending on a material of the brake friction material.

17. The method of claim 14, wherein, in the invalid data processor, the invalid period is a period in which a vehicle speed is less than a reference vehicle speed set as a vehicle speed at which evaluation in the preceding test evaluation process is completed.

18. The method of claim 14, wherein the stabilization data period extractor accepts a period in which a standard deviation of the friction coefficient from an arbitrary starting time point to an $n^{th}$ time point set at predetermined regular time intervals is maintained at a predetermined reference value or less from the arbitrary starting time point to an $m^{th}$ time point (where m<n) as a valid period, determines data in the accepted valid period as data for model training, and removes data in remaining periods other than the accepted valid period.

* * * * *